United States Patent [19]

Thurm et al.

[11] 4,344,704

[45] Aug. 17, 1982

[54] METHOD OF DETERMINING CORRECTION PARAMETERS FOR USE IN LIGHT-AMOUNT ADJUSTMENT IN A COLOR COPYING OPERATION

[75] Inventors: Siegfried Thurm, Voiswinkel; Konrad Bunge, Cologne, both of Fed. Rep. of Germany

[73] Assignee: Agfa-Gevaert Aktiengesellschaft, Leverkusen, Fed. Rep. of Germany

[21] Appl. No.: 160,974

[22] Filed: Jun. 19, 1980

[30] Foreign Application Priority Data

Jun. 22, 1979 [DE] Fed. Rep. of Germany ....... 2925264

[51] Int. Cl.³ ............................................. G03B 27/32
[52] U.S. Cl. ........................................ 355/77; 355/35
[58] Field of Search ..................... 355/77, 38, 32, 35

[56] References Cited

U.S. PATENT DOCUMENTS

| | | | |
|---|---|---|---|
| 3,582,325 | 6/1971 | Paulus | 355/77 |
| 3,724,947 | 4/1973 | Paulus | 355/38 |
| 4,092,067 | 5/1978 | Grossmann | 355/77 |
| 4,101,216 | 7/1978 | Grossmann | 355/38 |
| 4,168,120 | 9/1979 | Freier et al. | 355/77 |
| 4,192,605 | 3/1980 | Fergg et al. | 355/77 |
| 4,203,671 | 5/1980 | Takahashi et al. | 355/77 |
| 4,244,654 | 1/1981 | Asai et al. | 355/38 |

*Primary Examiner*—Monroe H. Hayes
*Attorney, Agent, or Firm*—Kontler & Grimes

[57] ABSTRACT

A method of determining correction parameters for adjusting the amounts of light to which originals are to be exposed in a color copying operation in dependence on the composition deviations of the respective original from a calibrating original involves establishing, for each of a multitude of regions of the respective original, two characteristic values respectively representative of a relationship between the blue and green color values, on the one hand, and the red and green color values, on the other hand, averaging those of the established characteristic values the relationships of which are within a distribution range normally encountered in an image of an object on the original, forming an average from the average values, and ascertaining the magnitude and direction of the correction parameters from the difference between the average obtained from the particular original and a like average obtained from the calibrating original. The regions into which the original is subdivided are successively scanned and the scanned area of each region is only a small fraction of the total area of the respective region. The method may be performed on a single original or on a series of originals.

13 Claims, 4 Drawing Figures

METHOD OF DETERMINING CORRECTION PARAMETERS FOR USE IN LIGHT-AMOUNT ADJUSTMENT IN A COLOR COPYING OPERATION

BACKGROUND OF THE INVENTION

The present invention relates to a method of determining correction parameters for use in adjusting the amounts of light to which originals are to be exposed in a color copying operation in dependence on the composition deviations of the respective originals from a calibrating original. More particularly, the present invention is related to a correction-parameter determining method in which the significance of associated regions of the original which are essentially of the same color, or so-called color dominants, is suppressed during the determination of the correction parameters.

It is well known that, during the production of photographic positives from color negative originals, a copying arrangement copies the color negative onto the positive material using the three basic colors red, green and blue. In order to obtain an optimum positive, it is necessary to use precise amounts of light in these colors during the copying of the negative on the photosensitive positive material, which amounts, in most instances, vary from one negative or original to another. In view of the high copying speeds of currently used copying apparatus or printers, these correct light amounts in the various colors cannot be selected by an observer or copying machine operator; rather, these light amounts must be determined in accordance with objective criteria.

In the following discussion, it will be assumed, for the sake of simplicity but without limiting the general application of the method of the present invention, that the copying apparatus is of the type wherein the changes in the copying light amounts in the three colors are achieved by varying the corresponding times of exposure. A copying apparatus capable of performing in this manner is disclosed, for instance, in a commonly owned U.S. Pat. No. 4,101,217 granted on July 18, 1978 to Fergg el al, to which reference may be had for details of the copying apparatus, if necessary. The copying apparatus is so adjusted ("basic adjustment") that a well-exposed negative image which is average as to its color and light distribution ("standard original") results in an optimum positive image at equally long times of illumination of the original in the three colors. Now, in order to obtain the best positive image from an arbitrary negative image which is structured differently from the standard original, certain corrections must be made in the interval of exposure in the various colors. Such corrections involve, on the one hand, the average exposure ("density correction") and, on the other hand, the illumination ratios in the various colors ("color correction"). The present application is concerned with the objective determination of the color corrections.

There have already been made numerous proposals for solving this problem. Many commercially available printers or copying apparatus operate on the following basis: with respect to most images, the color balance (that is, the relative proportions of the basic colors) is not far removed from the balance which is obtained by averaging over a multitude of images. Now, if the color balance of a particular original or negative, which is obtained by measuring the latter, deviates from the equilibrium of the standard original, then corrections are made in the copying light amounts or intervals relative to the basic adjustment of the printer or copying apparatus. Of course, when this approach is resorted to, it results in incorrect positive images when the original in question bears an image whose balance was far removed from the average value ("color dominant"). The current methods based on the aforediscussed principle scan the negative or original at a multitude of spatially distributed regions, and evaluate the measured values obtained during the scanning in accordance with certain criteria. Under these circumstances, it is often necessary to preliminarily evaluate a great number of negatives or originals before it is possible to draw proper conclusions from the scanned individual values as to the needed color correction. This, of course, is very disadvantageous.

OBJECTS AND SUMMARY OF THE INVENTION

Accordingly, it is a general object of the present invention to avoid the disadvantages of the prior art.

More particularly, it is an object of the present invention to provide a method of determining correction parameters for use in adjusting the amounts of light to which originals are to be exposed in a color copying operation in dependence on composition deviations from a calibrating original, which method is not possessed of the disadvantages of the conventional methods of this type. Yet another object of the present invention is to develop a method of the type here under consideration which renders it possible to obtain proper color correction parameters from the measured values obtained from only one negative or of only a few negatives of a filmstrip.

An additional object of the present invention is to provide a method of correction-parameter determination which is simple and yet achieves reliable results.

In pursuance of these objects and others which will become apparent hereafter, one feature of the present invention resides in a method of determining correction parameters for use in adjusting the amounts of light to which originals are to be exposed in a color copying operation in dependence on the composition deviations of this original from a calibrating original, which method, briefly stated, comprises the steps of establishing, for each of a multitude of regions of the respective original, two characteristic values each representative of a relationship between a different pair of at least three color values which are indicative of the color composition of the respective region; averaging those of the established characteristic values the relationships of which are within a distribution range normally encountered in an image of an object on the original; forming an average from the average values; and ascertaining the magnitude and direction of the correction parameters from the difference between the aforementioned average and a correspondingly obtained average for the calibrating original. Advantageously, the establishing step includes so scanning the respective original that the size of each of the aforementioned regions substantially corresponds to that of the image of the smallest but still significant object on the original. A particularly simple embodiment of the method of the present invention is obtained when one of the characteristic values is established based on a relationship between the red and green color values and when the other of the characteristic values is established based on a relationship between the blue and green color values. Advantageously, the respective color values are subtracted from one another. It is particularly simple to perform the method of the present invention when the establishing step includes measuring the extinction coefficients of the aforementioned regions in the red, blue and green colors, and when the characteristic values are formed from the measured extinction coefficients in accordance with the aforementioned relationships.

A particular advantage obtained from resorting to the use of the method of the present invention is that, during the determination of the color balance in the negative, the image of each object which is considerably different from other object images in the color composition of the respective image is attributed the same weight independently of the size of the area which the image of such object assumes on the original.

This advantage will possibly be best appreciated based on the following example: Let us assume that the image on the original is of a woman standing on a meadow and wearing red garments, while a blue sky appears in the background. Under these circumstances, the four objects which predominate in the scene, that is, the face of the woman and other visable skin areas, the red garments, the green meadow, and the blue sky are equally evaluated in accordance with the method of the present invention. This kind of evaluation has an important property of invariance: it does not depend on the relative magnitudes of the respective objects; rather, it only depends on their number and type. Thus, in the given example, it is unimportant whether the woman stands close to or far away from the camera taking the picture, or whether a greater or lesser proportion of the remaining area of the image is assumed by the meadow or by the sky.

In accordance with a currently preferred aspect of the present invention, the respective original is so scanned that it is subdivided into approximately 100 of the above-mentioned regions. Advantageously, only about 10% of each of these regions is spot-scanned during the performance of the establishing step. It is further advantageous when the spot-scanned part of each of the regions is substantially circular and located substantially centrally of the respective region.

In accordance with a further concept of the present invention, the magnitude of the correction which is made at the copying apparatus is made dependent on the number of objects appearing in the original. For instance, the correction is small when the number of the objects is small, and the correction is large in the opposite case. The assumption that the magnitude of the color correction is to increase with an increasing number of the objects and decrease with a decreasing number of the objects on the original is supported by the fact that no meaningful correction for the printer adjustment can be derived from any negative or original on which there are present only a few objects.

The novel features which are considered as characteristic of the invention are set forth in particular in the appended claims. The color light amount correction parameter determining method, both as to its operation and the results obtained thereby, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic view representative of the original to be evaluated and indicating the scanned regions;

FIG. 2 is a diagrammatic representation of the measured points in an R,B coordinate system;

DETAILED DESCRIPTION OF THE PREFERRED EMBODIMENT

Figure 3:
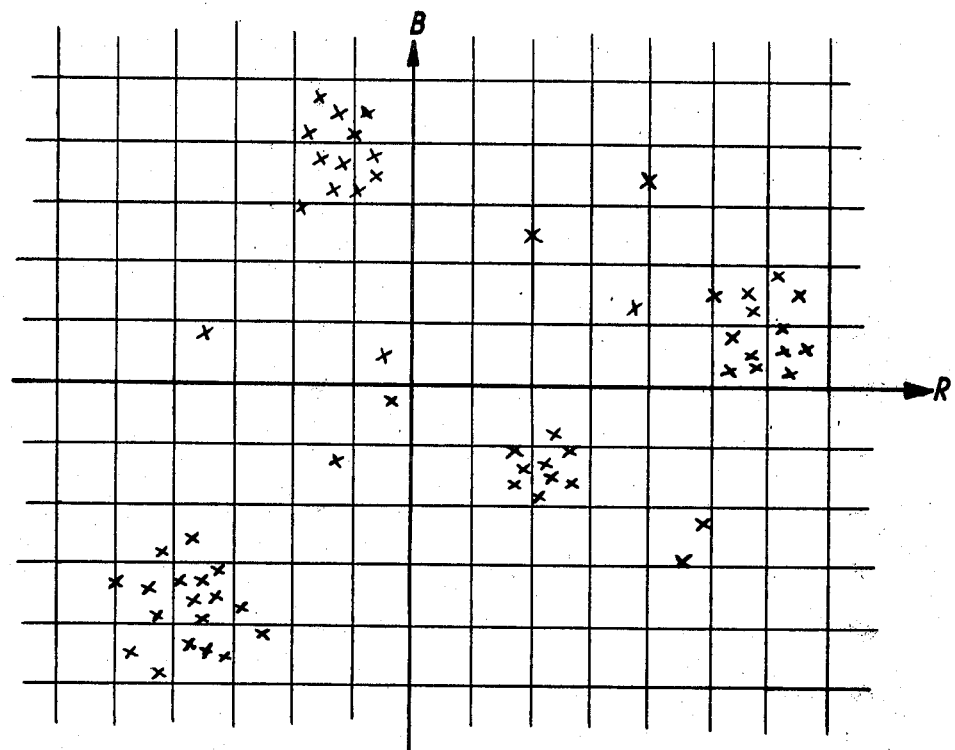
FIG. 3 is a diagrammatic view representative of the distribution of the measured points of FIG. 2 among sections or cells, which respectively correspond to the particular objects of the original.

Referring now to the drawing in detail, and first to FIG. 1 thereof, it may be seen that it diagrammatically illustrates the subdivision of the respective original or negative into rectangular regions to be scanned. The size of the regions illustrated in FIG. 1 is so selected that it substantially corresponds to the area assumed in the original by the smallest object which is still preceived to be of significance in the original. The number of these rectangular regions is m×n. This product has a value of approximately 100. Consequently, each of the rectangular regions extends over approximately 1% of the area of the negative or original. The circles in the rectangular regions indicate the areas at which the extinction coefficients in the three basic colors are measured during the scanning of the original. Advantageously, the size of these circular areas amounts to approximately 10% of the area of the respective rectangular region. The size of the circular areas is selected in this manner in order to obtain measured values from areas which, in most instances, are fully located in the respective object image and do not extend across the boundaries thereof. The measured values for the negative or original are $(E_b, E_g, E_r)_{ik}$, wherein $E_b$ is the extinction coefficient for the blue color, $E_g$ is the extinction coefficient for the green color, $E_r$ is the extinction coefficient for the red color, $i=1\ldots m$, and $k=1\ldots n$. Thereafter, there are produced, from these triple values, pairs of values $(B,R)_{ik}$, wherein $B=E_b-E_g$, and $R=E_r-E_g$.

The points which correspond to the pairs $(B,R)_{ik}$ are illustrated in FIG. 2 in a coordinate system having axes B,R. The arrangement or distribution of the points shown in FIG. 2 could be representative, at least approximately, of the above-discussed example of an image of a woman wearing red garments and standing on a meadow with blue sky as the background. The assembly of the points at the upper left part of FIG. 2 stems from the blue of the sky, the assembly of points at the lower left stems from the green of the meadow, the assembly of points at the upper right stems from the red garments, while the assembly of points at the lower right corresponds to the color of the face and other exposed skin areas of the woman. The other points which are still present in FIG. 2 may stem from smaller objects, such as, for instance, flowers in the meadow or the like. At this point, the diagram of FIG. 2 is subdivided into sections or "cells" which cover the area of the diagram of FIG. 2 without leaving any gaps.

FIG. 3 shows the result of such a subdivision. The cells are, in general, to be so selected that their sizes approximately correspond to the distribution range of the points for a particular object. It is currently preferred that the lengths of the edges of such cells amount to approximately 0.05 extinction units. For the following discussion, it is assumed that each of the points is situated within one cell. This can be achieved, for instance, in that the extinction coefficients are measured only to the accuracy of ±0.01, while the boundaries of the cells in the R or B directions lie at $0.01 \times \pm 0.005$, wherein x is an integer. now, it is assumed that the number of the points in the first cell is N1, in the second cell N2 and so on. Thereupon, during the first evaluating step, there is formed the average value of the point coordinates within each cell, as e.g. $(B, R)1 = 1/N1\Sigma(B, R)ik$ for the first cell, wherein the summation is to be performed for all number pairs within the respective cell.

Figure 4:
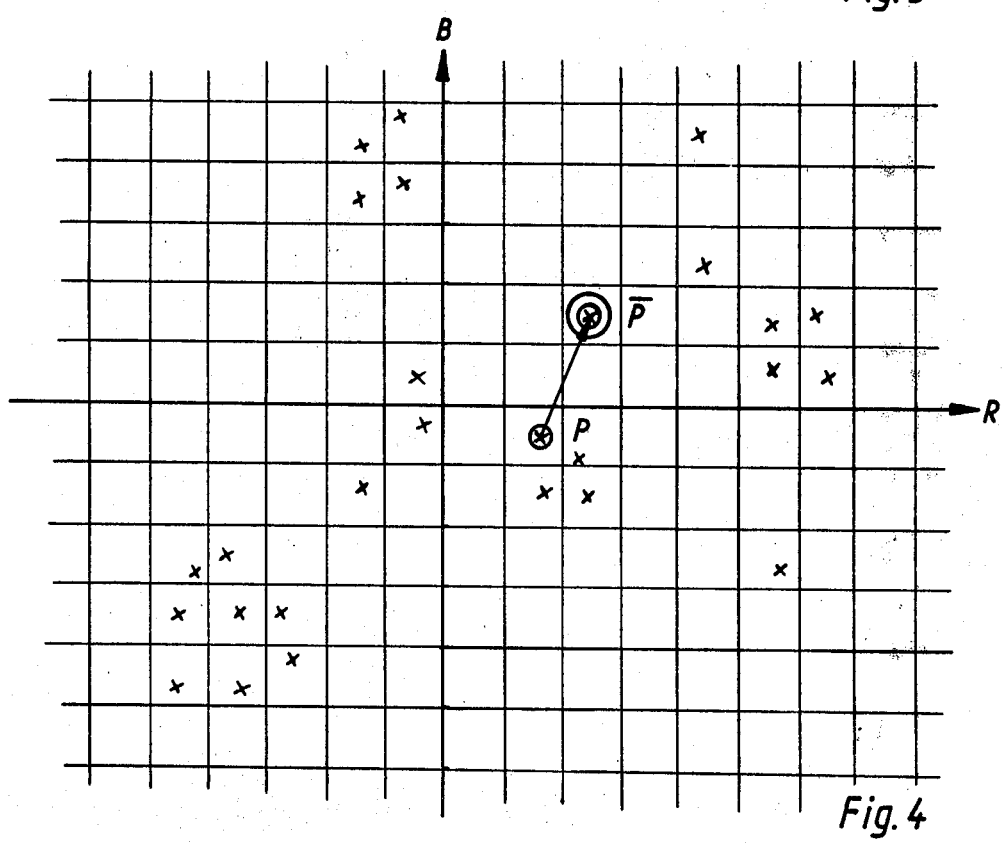
FIG. 4 is a diagrammatic view representative of the process for obtaining average values in the individual cells of the R,B coordinate system.

The numbered pairs (B,R) are shown in FIG. 4 in a B,R coordinate system. A simplified embodiment of the method which nevertheless achieves good results is obtained when the pairs (B,R) are replaced by such pairs which are situated at a predetermined location of the cell, approximately at the intersection of the diagonals when the cells are rectangular. In a second evaluating step, an average of the (B,R) pairs is obtained. The result of this averaging is $(B,R)_A = 1/N\Sigma(B,R)$, wherein N is the number of the occupied cells and the summation is conducted over all occupied cells. The point which is representative of the value $(B,R)_A$ is entered in FIG. 4 as point P. In addition thereto, there is shown in FIG. 4 a point $\bar{P}$ $\overline{(B,R)}$ which corresponds to a point obtained in accordance with the above-discussed evaluation method for the above-defined standard original. In the third step of the evaluation, an arrow Pf is drawn from P to $\bar{P}$. Then, the direction of this arrow Pf indicates the direction of the color correction to be made. The magnitude of the color correction is obtained as a result of the multiplication of the length of the arrow Pf by a function f(N) which monotonously increases with the number of the occupied cells N. The function f(N) can be, for instance, so selected that its value is set at zero for $N = 1, 2, 3$ and 4, and at one for $N = 50, 51 \ldots 100$. Then, it can be linearly interpolated in the intermediate region between 4 and 50. The correlation between the length and direction of the arrow Pf and the magnitude and direction of the correction to be made in the copying light amounts is determined during a single calibrating operation using negatives or originals which have different color compositions, color dominants, hues or tints.

Of course, the method of the present invention can also be used when it is desired to determine a common correction parameter value for a set of negatives or films, such as the color negatives of a single filmstrip.

The graphic representation of the method proposed by the present invention in FIGS. 1 to 4 is intended to serve the sole purpose of facilitating the understanding of the present invention by graphically demonstrating the same. In actual practice, however, the method can be performed by a suitable computer, such as a microprocessor, having a sufficient storage capacity, in which the measured values are transformed into color relationships and sorted in predetermined groups. Then, the double formation of the average values and the measurement of the needed correction parameters is performed on the basis of the stored and grouped color relationship values, which leads from the exposure values of the calibrating original to the corrected exposure values for the original which is to be copied. The results of this calculating operation can then be directly transferred into the copying apparatus to be used by the latter for the control of the exposure in the various colors. For the sake of completeness, it is to be pointed out that the cell distribution can also be performed in three dimensions, wherein the extinction coefficient Eg serves as the third coordinate. However, at the present time, and based on current knowledge, this would seem to complicate the method proposed by the present invention, without achieving any tangible or unexpectedly improved results.

Without further analysis, the foregoing will so fully reveal the gist of the present invention that others can, by applying current knowledge, readily adapt if for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A method of determining a correction parameter for the copying of a colored original, comprising the steps of sensing a characteristic of each of the three primary colors in a plurality of regions of said colored original; establishing a pair of values for each of said regions from the sensed characteristics of said primary colors in the respective regions; classifying said pairs of values into distribution zones which respectively correspond to the spread of said values for an image on said colored original; averaging the pairs of values within the respective distribution zones to obtain an average value for each of said distribution zones, whereby the frequency with which each of said primary colors appears on said colored original is eliminated as a factor in the determination of said correction parameter and all of the sensed color compositions have substantially the same weight in said determination; forming an overall average from said average values; and ascertaining the magnitude and sense of said correction parameter from the difference between said overall average and a like average for a calibrating original.

2. The method as defined in claim 1, wherein the size of each of said regions is at least equal to that of the smallest significant image on said colored original.

3. The method as defined in claim 1, wherein said colored original is subdivided into approximately 100 of said regions.

4. The method as defined in claim 1, wherein said sensing step includes spot-scanning only 10% of each of said regions.

5. The method as defined in claim 1, wherein said sensing step includes spot-scanning only a substantially circular and substantially centrally located part of each of said regions.

6. The method as defined in claim 1, wherein said ascertaining step includes multiplying said difference by a function which monotonously increases with the number of said average values.

7. The method as defined in claim 1, wherein said average-forming step is performed for several frames of said colored original.

8. The method as defined in claim 1, wherein said sensing step includes measuring the extinction coefficients in said regions.

9. The method as defined in claim 1, wherein one of each of said pairs of values is established from a relationship between two of said primary colors and the other from a relationship between the third primary color and one of the two other primary colors.

10. The method as defined in claim 9, wherein one of each of said pairs of values is established from a relationship between red and green and the other from a relationship between blue and green.

11. The method as defined in claim 1, wherein each of said values is established by subtraction.

12. The method as defined in claim 1, wherein said correction parameter is indicative of the exposure adjustment required to copy said colored original.

13. The method as defined in claim 12, wherein said correction parameter is indicative of the exposure adjustment in each of said primary colors required to copy said colored original.

* * * * *